(12) United States Patent
Radel et al.

(10) Patent No.: US 11,612,048 B2
(45) Date of Patent: *Mar. 21, 2023

(54) ION BEAM TARGET ASSEMBLIES FOR NEUTRON GENERATION

(71) Applicant: PHOENIX NEUTRON IMAGING LLC, Monona, WI (US)

(72) Inventors: Ross Radel, Madison, WI (US); Tye Gribb, Fitchburg, WI (US)

(73) Assignee: PHOENIX NEUTRON IMAGING LLC, Monona, WI (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/130,190

(22) Filed: Dec. 22, 2020

(65) Prior Publication Data

US 2021/0112653 A1    Apr. 15, 2021

Related U.S. Application Data

(63) Continuation of application No. 16/430,839, filed on Jun. 4, 2019, now Pat. No. 10,874,013.
(Continued)

(51) Int. Cl.
*H05H 6/00*        (2006.01)
*H05H 3/06*        (2006.01)

(52) U.S. Cl.
CPC .............. *H05H 6/00* (2013.01); *H05H 3/06* (2013.01)

(58) Field of Classification Search
CPC .................................. H05H 6/00; H05H 3/06
See application file for complete search history.

(56) References Cited

U.S. PATENT DOCUMENTS

| 3,646,348 A | 2/1972 | Detaint |
| 3,860,827 A | 1/1975 | Cranberg |

(Continued)

FOREIGN PATENT DOCUMENTS

| CN | 108093552 | 5/2018 |
| GB | 931076 | 7/1963 |

(Continued)

OTHER PUBLICATIONS

Supplementary EP Search Report, EP Patent Application No. 19816015. 2, dated Feb. 17, 2022, 8 pages.
(Continued)

*Primary Examiner* — Sean M Luck
(74) *Attorney, Agent, or Firm* — Casimir Jones, S.C.; Brian F. Bradley

(57) ABSTRACT

Provided herein are systems, devices, articles of manufacture, and methods for generating neutrons employing a high energy ion beam target (HEIB target) and a target backing configured to be in contact with the bottom surface of the HEIB target (e.g., to generate an ion beam target assembly). In certain embodiments, the HEIB target has a thickness that is less than the penetration depth of protons or deuterons in the high energy ion beam that strikes the target. In certain embodiments, the target backing comprises a high hydrogen diffusion metal (e.g., palladium), has open spaces dispersed throughout for reduced proton diffusion distances, and has a shape and thickness such that all, or virtually all, of the protons or deuterons that pass through the HEIB target are stopped. Also provided herein are systems, devices, and methods for changing targets in an ion beam accelerator system.

19 Claims, 1 Drawing Sheet

Related U.S. Application Data

(60) Provisional application No. 62/681,432, filed on Jun. 6, 2018.

(56) References Cited

U.S. PATENT DOCUMENTS

| | | | |
|---|---|---|---|
| 3,924,137 | A | 12/1975 | Alger |
| 3,993,910 | A | 11/1976 | Parkin et al. |
| 8,837,662 | B2 | 9/2014 | Piefer |
| 9,024,261 | B2 | 5/2015 | Piefer |
| 9,894,746 | B2 * | 2/2018 | Norling ............... H05H 6/00 |
| 10,206,273 | B2 | 2/2019 | Kobernik et al. |
| 2007/0297554 | A1 * | 12/2007 | Lavie .................. H05H 6/00 |
| | | | 376/202 |
| 2009/0274256 | A1 | 11/2009 | Lipinski et al. |
| 2010/0067640 | A1 | 3/2010 | Willis et al. |
| 2011/0096887 | A1 | 4/2011 | Piefer |
| 2012/0300890 | A1 | 11/2012 | Piefer et al. |
| 2013/0129027 | A1 | 5/2013 | Pantell et al. |
| 2013/0327948 | A1 * | 12/2013 | Bendahan ............. H05H 3/06 |
| | | | 250/390.08 |
| 2015/0117584 | A1 | 4/2015 | Riken |
| 2016/0163495 | A1 | 6/2016 | Sherman et al. |
| 2017/0267908 | A1 | 9/2017 | Murakami et al. |
| 2019/0380195 | A1 | 12/2019 | Radel et al. |

FOREIGN PATENT DOCUMENTS

| | | |
|---|---|---|
| WO | WO 2008/025737 | 3/2008 |
| WO | WO 2013/159201 | 10/2013 |
| WO | WO 2019/236537 A2 | 12/2019 |
| WO | WO 2019/236537 A3 | 12/2019 |

OTHER PUBLICATIONS

International Search Report of related PCT/US2019/035326, dated Jan. 2, 2020, 21 pages.

* cited by examiner

ION BEAM TARGET ASSEMBLIES FOR NEUTRON GENERATION

The present application is a continuation of U.S. application Ser. No. 16/430,839, filed Jun. 4, 2019, which claims priority to U.S. Provisional application Ser. No. 62/681,432, filed Jun. 6, 2018, which is herein incorporated by reference in its entirety.

FIELD

Provided herein are systems, devices, articles of manufacture, and methods for generating neutrons employing a high energy ion beam target (HEIB target) and a target backing configured to be in contact with the bottom surface of the HEIB target (e.g., to generate an ion beam target assembly). In certain embodiments, the HEIB target has a thickness that is less than the penetration depth of protons in the high energy ion beam that strikes the target. In certain embodiments, the target backing comprises a high hydrogen diffusion metal (e.g., palladium), has open spaces dispersed throughout for reduced proton or deuteron diffusion distances, and has a shape and thickness such that all, or virtually all, of the protons or deuterons that pass through the HEIB target are stopped. Also provided herein are systems, devices, and methods for changing targets in an ion beam accelerator system.

BACKGROUND

A known method to produce neutrons is to bombard a Beryllium (Be) target with high energy (>2 MeV) protons. The Beryllium needs to be cooled to prevent melting and/or thermal distortion. Typical geometry is a Be disk brazed to a water-cooled block, or a Be block sealed to a holder and directly cooled on the back side (away from beam) by water or other fluid. A consistent problem with this method is that embedded protons embrittle and swell the material in which they are embedded. Eventually, this results in direct physical degradation (spalling) of the target. The typical embedded dose limit before visible target damage is about $10^{18}$ protons/cm$^2$. In high power density systems, visible damage can occur in minutes of exposure.

One approach to mitigate this issue is by making the Be target thinner than the stopping distance of the protons so that relatively few protons are deposited into the Be. The depth that the protons penetrate a material depends on the proton energy and material in which the protons are deposited into. In the case of the Be target that is directly fluid-cooled, the protons are deposited into the cooling fluid and no swelling occurs. However, the Be target is the vacuum barrier and subject to damage from the proton beam. Target lifetime would be stochastic, and a failure would result in catastrophic flooding of the vacuum system requiring a conservative replacement schedule. In the case of the Be target mounted to a fluid-cooled substrate, the protons are deposited in the substrate that is subject to the same blistering and spalling damage. However, by choosing substrate materials that can absorb a relatively large amount of hydrogen, the lifetime of the target can be increased. For example, tantalum can hold about 100 to 1000 times the amount of hydrogen than Be before damage. In high power systems, this can result in target lifetimes measured in 100's of hours or more, but still finite. In such cases, the creation of high neutron fluxes will cause materials to become activated. What is needed are designs that can be optimized to reduce the production of long-lived radioactive isotopes. This will allow for easier and safer handling and maintenance of the targets and higher uptime for the device in which they are utilized.

SUMMARY

Provided herein are systems, devices, articles of manufacture, and methods for generating neutrons employing a high energy ion beam target (HEIB target) and a target backing configured to be in contact with the bottom surface of the HEIB target (e.g., to generate an ion beam target assembly). In certain embodiments, the HEIB target has a thickness that is less than the penetration depth of protons in the high energy ion beam that strikes the target. In some embodiments, the HEIB target comprises a metal selected from beryllium, uranium, lithium, a lithium compound, tungsten, and tantalum. In certain embodiments, the high energy ion beam comprises protons and/or deuterons. In certain embodiments, the target backing comprises a high hydrogen diffusion metal (e.g., palladium), has open spaces dispersed throughout for reduced proton or deuteron diffusion distances, and has a shape and thickness such that all, or virtually all, of the protons or deuterons that pass through the HEIB target are stopped. In some embodiments, the high energy ion beam comprises hydrogen ions or deuterium ions. Also provided herein are systems, devices, and methods for changing targets in an ion beam accelerator system.

In some embodiments, provided herein are systems comprising: a) a high energy ion beam target (HEIB target) having a top surface and a bottom surface, wherein the HEIB target generates neutrons when exposed to a high energy ion beam, and wherein the HEIB target has a thickness between the top and bottom surfaces that is less than the penetration depth of protons in the high energy ion beam; and b) a target backing comprising a high hydrogen diffusion metal (HHDM), wherein the target backing has open spaces dispersed throughout such that the proton or deuteron diffusion distance is reduced throughout the target backing compared to if the target backing was a solid piece without the open spaces, wherein the target backing is configured to be positioned in contact with the bottom surface of the HEIB target, and wherein the target backing has a shape and thickness such that all, or virtually all, of the protons or deuterons in the higher energy ion beam that pass through the HEIB target are stopped by the target backing when it is positioned in contact with the HEIB target. In certain embodiments, the ion beam comprises protons. In other embodiments, the ion beam comprises deuterons. In some embodiments, the HEIB target comprises a metal selected from beryllium, uranium, lithium, a lithium compound, tungsten, and tantalum.

In certain embodiments, provided herein are articles of manufacture comprising: a) an ion beam target assembly, wherein the ion target beam assembly comprises: i) a high energy ion beam target (HEIB target) having a top surface and a bottom surface, wherein the HEIB target generates neutrons when exposed to a high energy ion beam, and wherein the HEIB target has a thickness between the top and bottom surfaces that is less than the penetration depth of protons in the high energy ion beam; and ii) a target backing comprising a high hydrogen diffusion metal (HHDM), wherein the target backing has open spaces dispersed throughout such that the proton or deuteron diffusion distance is reduced throughout the target backing compared to if the target backing was a solid piece without the open spaces, wherein the target backing is attached to the bottom surface of the HEIB target, and wherein the target backing has a shape and thickness such that all, or virtually all, of the protons or deuterons in the higher energy ion beam that pass through the HEIB target are stopped by the target backing. In some embodiments, the HEIB target comprises a metal selected from beryllium, uranium, lithium, a lithium compound, tungsten, and tantalum.

In particular embodiments, provided herein are methods of generating neutrons comprising: a) inserting both the HEIB target and the target backing (in contact with each other), or an ion beam target assembly, as described herein, into a target chamber of an ion beam accelerator system, and b) generating a high energy ion beam with the ion accelerator system such that the high energy ion beam strikes the HEIB target, thereby generating neutrons. In certain embodiments, the methods further comprise: c) collecting at least some of the neutrons. In other embodiments, step b) is conducted continuously for at least 2 days (e.g., 2 . . . 5 . . . 20 . . . 45 . . . 100 . . . 1000 days) without failure of the HEIB target. In further embodiments, step b) is conducted continuously for at least 14 days without failure of the HEIB target.

In some embodiments, the open spaces in the target backing are selected from: pores, grooves, holes, corrugations, channels, open cells, honeycomb cells, dimples, irregular openings, or any combination thereof. In certain embodiments, the target backing is attached to, or configured to be attached to, the bottom surface of the HEIB target by brazing, welding, diffusional bonding, or any other method that results in a low thermal resistance.

In particular embodiments, the systems and articles of manufacture further comprise a cooled substrate. In some embodiments, the target backing is attached to, or configured to be attached to, the cooled substrate. In further embodiments, the cooled substrate comprises a water cooled substrate or glycol cool substrate. In other embodiments, the cooled substrate comprises copper and/or aluminum.

In some embodiments, the HEIB target comprises: i) a first layer comprising a metal (e.g., beryllium, uranium, lithium, tungsten, and tantalum), and ii) a second layer comprising a metal different than used in said first layer selected from the group consisting of: beryllium, uranium, lithium, tungsten, and tantalum. In certain embodiments, the HEIB target comprises a first layer comprised of beryllium and a second layer comprises of uranium. In certain embodiments, using multiple layers in the target are employed to slow down the ion beam as it traverses the target, slowing it down from its original energy to lower energies (mostly due to electron interactions). In some embodiments, using different materials at different lengths (energies) along the beam path allows a better optimization of neutron yield, energy, and angular distribution.

In some embodiments, HEIB target has a thickness between 1 and 15 mm (e.g., 1 . . . 3 . . . 10 . . . 12 . . . and 15 mm), and a diameter between 20 and 100 mm (e.g., 20 . . . 45 . . . 65 . . . and 100 mm). In certain embodiments, the thickness of the target backing is between 2 and 10 mm (e.g., 2 . . . 5 . . . 7.5 . . . and 10 mm). In some embodiments, the HEIB target and the target backing are generally disk shaped, square shaped, octagon shaped, ellipsoidal, rectangular, and have the same diameter. The HEIB target may also be designed to such that the high energy ion beam strikes the target at an incident angle of 90°, or an incident angle other than 90° (e.g. 45° . . . 60° . . . 30°, etc.), which has the effect of increasing the area over which the beam strikes the target, thus reducing the power density of the beam by the geometric amount. In some embodiments, such targets have an ellipsoidal, rectangular, or other elongated shape in the direction of the target tilt.

In certain embodiments, at least 94% of the HEIB target is a metal selected from beryllium, uranium, lithium, a lithium compound, tungsten, and tantalum (e.g., 95% . . . 98% . . . 99% . . . or 100%). In further embodiments, the high hydrogen diffusion metal (HHDM) comprises palladium. In other embodiments, the high hydrogen diffusion metal (HHDM) is selected from the group consisting of: palladium, titanium, vanadium, niobium, zirconium, and any combination thereof (e.g., combination of vanadium and palladium). In particular embodiments, the HHDM is composed of a combination of these elements, specifically with a less expensive material (e.g. vanadium) coated with a thin layer of a more expensive material (e.g. palladium) known to have superior hydrogen surface diffusion properties. In some embodiments, at least 94% of the target backing is the high hydrogen diffusion metal (HHDM) (e.g., 95% . . . 97.5% . . . 99% . . . or 100%). In certain embodiments, the target backing is composed of a solid vanadium core that is coated with a thin film of palladium.

In additional embodiments, the systems and articles of manufacture further comprise: a target chamber. In certain embodiments, the target backing is positioned at (e.g., attached to) the bottom surface of the HEIB target thereby generating an ion beam target assembly, wherein the ion beam target assembly is located in the target chamber. In other embodiments, the systems and articles of manufacture further comprise: an ion source configured to produce a ion beam (e.g., proton beam or deuteron beam); and an accelerator operatively coupled to the ion source and configured to receive the ion beam and accelerate the ion beam to generate the high energy ion beam. In further embodiments, the target backing is attached to the bottom surface of the HEIB target thereby generating an ion beam target assembly, and wherein the system further comprises: a target chamber containing the ion beam target assembly. In further embodiments, the ion beam target assembly is sized and positioned inside the target chamber such that failure of the HEIB target does not result in vacuum breach in the accelerator.

In some embodiments, the protons or deuterons in the high energy ion beam are >2 MeV protons or deuterons. In further embodiments, the HEIB target can be struck with the high energy ion beam for at least 24 hours total time longer (e.g., 24 . . . 50 . . . 100 . . . or 1000 hours longer) before failure when the backing component is positioned in contact with the bottom surface of the HEIB target, as compared to the HEIB target when not positioned in contact with the backing component. In further embodiments, the HEIB target can be struck with the high energy ion beam for at least 7 days total time longer (e.g., 7 . . . 25 . . . 100 . . . 1000 days longer) before failure when the backing component is positioned in contact with the bottom surface of the HEIB target, as compared to the HEIB target when not positioned in contact with the backing component.

In additional embodiments, provided herein are systems comprising: a) an ion source configured to produce an ion beam; b) an accelerator operatively coupled to the ion source and configured to receive the ion beam and accelerate the ion beam to generate an accelerated ion beam; c) a target chamber comprising a target holding mechanism, wherein the target holding mechanism is configured to: i) hold a target that, when struck with the accelerated ion beam, generates neutrons and becomes a radioactive target over time, and ii) allow the radioactive target to be removed from the target chamber using at least one long-handled tool that keeps a user of the long-handled tool from being irradiated.

In certain embodiments, provided herein are methods comprising: a) inserting a first target, from a set of at least two targets, into an ion beam accelerator, b) activating the ion beam accelerator for a length of time such than an ion beam strikes the first target, thereby generating neutrons and causing the first target to become a first radioactive target; c) removing the first radioactive target from the ion beam accelerator; d) inserting a second target, from the set of at least two targets, into the ion beam accelerator; e) activating the ion beam accelerator for a length of time such than ion beam strikes the second target, thereby generating neutrons and causing the second target to become a second radioactive target; f) identifying that the first radioactive target has cooled over time to become substantially or fully non-radiative to generate a cooled first target, and inserting the cooled first target into the ion beam accelerator; and g) activating the ion beam accelerator for a length of time such that an ion beam strikes the cooled first target, thereby generating neutrons and causing the first cooled target to become re-radioactive first target.

In certain embodiment, the at least two targets is at least five targets which includes the first and second targets, as well as third, fourth, and fifth targets, and wherein steps a) and b) are repeated using the third target, then the fourth target, and then the fifth target. In other embodiments, steps f) and g) are repeated using the second, third, fourth, and fifth targets after they have cooled. In additional embodiments, the at least two targets is at least ten targets.

In some embodiments, provided herein are systems comprising: a) an ion source configured to produce an ion beam; b) an accelerator operatively coupled to the ion source and configured to receive the ion beam and accelerate the ion beam to generate an accelerated ion beam; c) a target chamber configured to receive the accelerated ion beam; and d) a target changing mechanism, wherein the target changing mechanism is configured to: i) hold a plurality of targets, wherein each target, when struck with the accelerated ion beam in the target chamber generates neutrons, ii) hold one of the plurality of targets in a first position that is inside the target chamber and is in the path of the accelerated ion beam, while holding the remaining targets outside the target chamber, and iii) move the target in the first position to a position outside the target chamber, and move one of the remaining targets into the first position inside the target chamber. In further embodiments, the at least one of the plurality of targets, when not in the first position, are in a position outside the chamber that allows any accumulated radiation to substantially or fully dissipate. In other embodiments, the at least one of the plurality of targets, when not in the first position, can be removed from the system without stopping or disrupting the operation of the accelerated ion beam. In certain embodiments, the target changing mechanism comprises a carousel, turret, or magazine (e.g., that allow targets to be moved without human intervention, or without human intervention beyond activating the target changing mechanism). In particular embodiments, the at least one of the plurality of targets, when not in the first position, is automatically deposited into a radiation container. In additional embodiments, the target changing mechanism is further configured to allow one or more additional targets to be added and held by the target changing mechanism without stopping or disrupting the operation of the accelerated ion beam.

In certain embodiments, provided herein are devices comprising: a target changing mechanism for an ion beam accelerator having a target chamber, wherein the target changing mechanism is configured to: a) hold a plurality of targets, wherein each target, when struck with an accelerated ion beam in the target chamber generates neutrons, b) hold one of the plurality of targets in a first position that is inside the target chamber and is in the path of the accelerated ion beam, while holding the remaining targets outside the target chamber, and c) move the target in the first position to a position outside the target chamber, and move one of the remaining targets into the first position inside the target chamber.

In certain embodiments, the target, target holding mechanism, target chamber, braze and/or weld materials, fasteners, and all other components are selected to minimize the production of long-lived (e.g. 120 day half-life) radioactive isotopes resulting from neutron capture and other neutron reactions. Utilization of these materials will allow for easier and safer handling and maintenance of the targets and higher uptime for the device in which they are utilized. Furthermore, reduction of the activity of the target allows for easier licensing and disposal. Exemplary materials include aluminum, vanadium, aluminum bronzes, and aluminum-based brazes (e.g. 1100 and 4043).

DETAILED DESCRIPTION

Figure 1A:
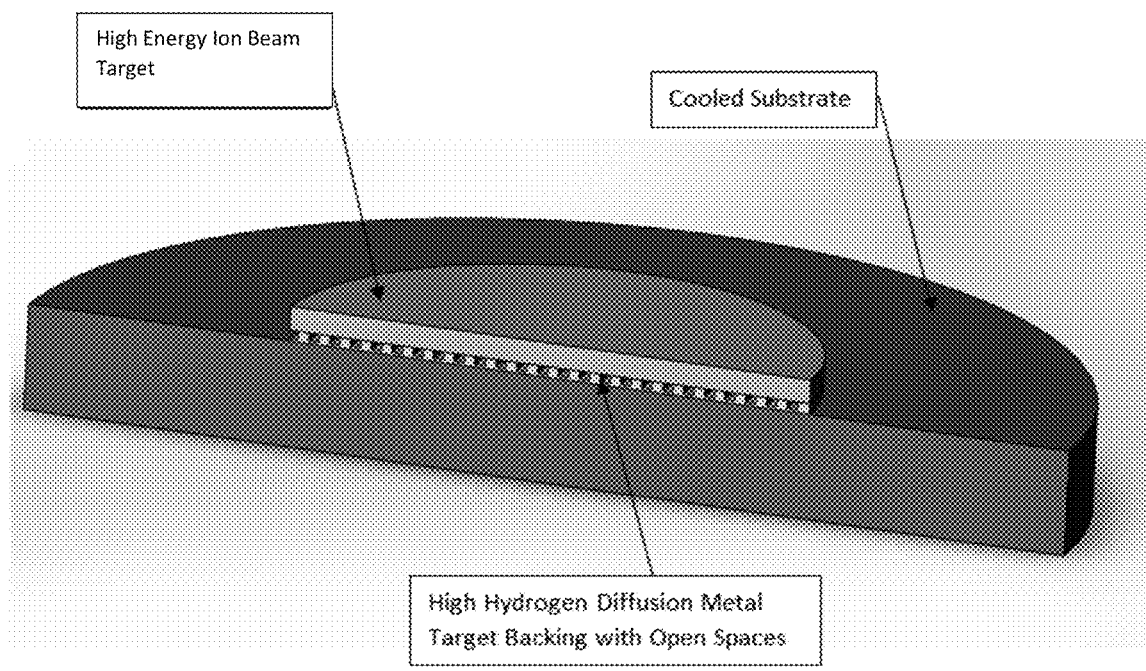
FIG. 1A shows an exemplary schematic of a cross-section of an ion beam target assembly composed of a high energy ion beam target (e.g., composed of beryllium) attached to a high hydrogen diffusion metal target backing (e.g., composed of palladium) with open spaces. The ion beam target assembly is shown attached to a cooled substrate (e.g., which is composed of copper or aluminum).
Figure 1B:
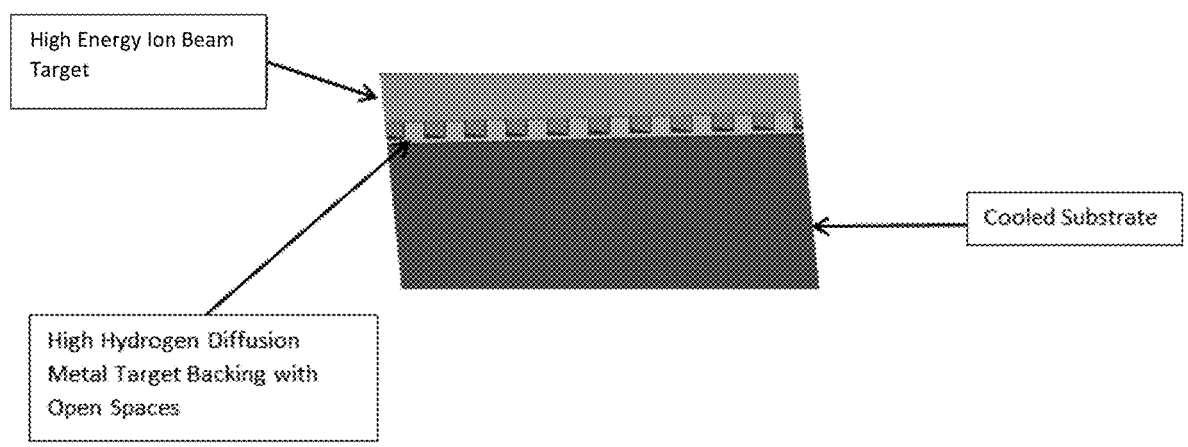
FIG. 1B shows a close up section of the exemplary ion beam target assembly from FIG. 1A, showing close up detail of the open spaces in the target backing.

Provided herein are systems, devices, articles of manufacture, and methods for generating neutrons employing a high energy ion beam target (HEIB target) and a target backing configured to be in contact with the bottom surface of the HEIB target (e.g., to generate an ion beam target assembly). In certain embodiments, the HEIB target has a thickness that is less than the penetration depth of protons in the high energy ion beam that strikes the target. In some embodiments, the HEIB target comprises a metal selected from beryllium, uranium, lithium, a lithium compound, tungsten, and tantalum. In certain embodiments, the ion beam comprises protons. In other embodiments, the ion beam comprises deuterons. In certain embodiments, the target backing comprises a high hydrogen diffusion metal (e.g., palladium), has open spaces dispersed throughout for reduced proton or deuteron diffusion distances, and has a shape and thickness such that all, or virtually all, of the protons or deuterons that pass through the HEIB target are stopped. Also provided herein are systems, devices, and methods for changing targets in an ion beam accelerator system. Individually or collectively the ion beam target assemblies (and components thereof) may be applied to, for example, any non-reactor source of high energy neutrons. Embodiments of the technology may be employed with high energy ion beam generator systems such as those described in, U.S. Pat. Publ. No. 2011/0096887, 2012/0300890; U.S. patent application Ser. No. 15/873,664; and 2016/0163495 and U.S. Pat. Nos. 8,837,662 and 9,024,261, all of which are herein incorporated by reference in their entireties.

Non-limiting embodiments of the articles, devices, and systems include the following. A beryllium (or uranium, lithium, a lithium compound, tungsten, or tantalum) target is bonded to a thin corrugated palladium target backing (e.g., sheet) that is bonded to a water cooled substrate (e.g., copper or aluminum). The thickness of the beryllium is less than the penetration depth of the incident protons. The thickness of the target backing is sufficient so that all of the protons or deuterons are stopped by the target backing. The target backing is grooved in any pattern that, for example, makes most of the palladium metal a relatively short distance from a surface. The diffusion and solubility of hydrogen in palladium is extraordinarily high. Excess hydrogen (protons) implanted in the palladium are able to diffuse to a nearby groove and leave the system before damage occurs to palladium. The lifetime is very long, limited only by the small damage incident onto the Be. Palladium thickness and relative amount of grooving is used to tune the temperature of the palladium under irradiation to increase diffusion rates. Failure of target would not result in vacuum breach. Any material that has relatively high hydrogen diffusivity may be used instead of the palladium. Suitable performance may be obtained with significantly cheaper materials such as titanium, vanadium, niobium, zirconium, etc. Besides grooving, any mechanism to reduce diffusion distances for the hydrogen could also be employed. For example, a porous open celled palladium (or other material) created from powder metallurgy, or other, technique could also be used.

We claim:

1. A system comprising:
a) a high energy ion beam target (HEIB target) comprising a metal and having a top surface and a bottom surface, wherein said metal is selected from the group consisting of: beryllium, uranium, lithium, tungsten, and tantalum, wherein said HEIB target generates neutrons when exposed to a high energy ion beam of protons and/or deuterons, and
wherein said HEIB target has a thickness between said top and bottom surfaces that is less than the penetration depth of protons or deuterons in said high energy ion beam; and
b) a target backing comprising a high hydrogen diffusion metal (HHDM),
wherein said target backing has gas or vacuum filled open spaces dispersed throughout such that the proton or deuteron diffusion distance is reduced throughout said target backing compared to if said target backing was a solid piece without said open spaces,
wherein said target backing is configured to be positioned in contact with said bottom surface of said HEIB target, and
wherein said target backing has a shape and thickness such that all, or virtually all, of said protons and/or deuterons in said high energy ion beam that pass through said HEIB target are stopped by said target backing when it is positioned in contact with said HEIB target.

2. The system of claim 1, wherein said open spaces are selected from: pores, grooves, holes, corrugations, channels, open cells, honeycomb cells, irregular openings, or any combination thereof.

3. The system of claim 1, wherein said target backing is attached to, or configured to be attached to, said bottom surface of said HEIB target by brazing, welding, soldering, diffusion, or bonding.

4. The system of claim 1, further comprising: c) a fluid-cooled substrate fluidly separated from the gas or vacuum filled open spaces.

5. The system of claim 4, wherein said target backing is attached to, or configured to be attached to, said fluid-cooled substrate.

6. The system of claim 1, wherein said HEIB target comprises: i) a first layer comprising said metal, and ii) a second layer comprising a metal different than used in said first layer selected from the group consisting of: beryllium, uranium, lithium, tungsten, and tantalum.

7. The system of claim 4, wherein said fluid-cooled substrate comprises copper and/or aluminum.

8. The system of claim 1, wherein said HEIB target has a thickness between 2 mm and 25 mm, and a diameter between 25 mm and 150 mm.

9. The system of claim 1, wherein said thickness of said target backing is between 2 mm and 10 mm.

10. An article of manufacture comprising: a) an ion beam target assembly, wherein said ion target beam assembly comprises:
i) a high energy ion beam target (HEIB target) comprising metal and having a top surface and a bottom surface, wherein said metal is selected from the group consisting of: beryllium, uranium, lithium, tungsten, and tantalum, wherein said HEIB target generates neutrons when exposed to a high energy ion beam of protons and/or deuterons, and
wherein said HEIB target has a thickness between said top and bottom surfaces that is less than the penetration depth of protons or deuterons in said high energy ion beam; and
ii) a target backing comprising a high hydrogen diffusion metal (HHDM),
wherein said target backing has gas or vacuum filled open spaces dispersed throughout such that the proton or deuteron diffusion distance is reduced throughout said target backing compared to if said target backing was a solid piece without said open spaces,
wherein said target backing is attached to said bottom surface of said HEIB target, and
wherein said target backing has a shape and thickness such that all, or virtually all, of said protons or deuterons in said high energy ion beam that pass through said HEIB target are stopped by said target backing.

11. The system of claim 10, wherein said open spaces are selected from: pores, grooves, holes, corrugations, channels, open cells, honeycomb cells, irregular openings, or any combination thereof.

12. The system of claim 10, wherein said target backing is attached to said bottom surface of said HEIB target by brazing, soldering, welding, or diffusion bonding.

13. The system of claim 10, further comprising: b) a fluid-cooled substrate fluidly separated from the gas or vacuum filled open spaces.

14. The system of claim 13, wherein said fluid-cooled substrate comprises copper and/or aluminum.

15. The system of claim 10, wherein said HEIB target comprises: i) a first layer comprising said metal, and ii) a second layer comprising a metal different than used in said first layer selected from the group consisting of: beryllium, uranium, lithium, tungsten, and tantalum.

16. The system of claim 10, wherein said HEIB target has a thickness between 2 mm and 25 mm, and a diameter between 25 mm and 150 mm.

17. The system of claim 10, wherein said thickness of said target backing is between 2 mm and 10 mm.

18. The system of claim 10, wherein target backing comprises a core of solid vanadium that is coated with a thin film of palladium.

19. The system of claim 10, wherein at least 95% of said HEIB target is said metal.

* * * * *